(12) United States Patent
McClure et al.

(10) Patent No.: US 11,882,166 B2
(45) Date of Patent: Jan. 23, 2024

(54) METHODS, SYSTEMS AND STORAGE MEDIA FOR GENERATING AN EFFECT CONFIGURED BY ONE OR MORE NETWORK CONNECTED DEVICES

(71) Applicant: Lemon Inc., Grand Cayman (KY)

(72) Inventors: Ray McClure, Los Angeles, CA (US); Nova Dando, London (GB); Kexin Lin, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/529,114

(22) Filed: Nov. 17, 2021

(65) Prior Publication Data

US 2023/0156056 A1 May 18, 2023

(51) Int. Cl.
*H04L 65/61* (2022.01)
*G06F 3/14* (2006.01)

(52) U.S. Cl.
CPC ............ *H04L 65/61* (2022.05); *G06F 3/1454* (2013.01)

(58) Field of Classification Search
CPC ......... H04L 65/60; H04L 65/61; H04L 63/08; H04L 63/102; H04L 63/0876; G06F 3/13; G06F 3/1454; G06F 21/10
USPC ......................................................... 709/217
See application file for complete search history.

(56) References Cited

U.S. PATENT DOCUMENTS

| | | | | |
|---|---|---|---|---|
| 10,291,607 | B1 * | 5/2019 | Cifelli | H04L 67/55 |
| 11,201,789 | B1 * | 12/2021 | Keane | H04L 41/0893 |
| 11,204,949 | B1 * | 12/2021 | Brewer | G06F 16/313 |
| 11,271,940 | B1 * | 3/2022 | Belli | H04L 63/0876 |
| 2014/0282780 | A1 * | 9/2014 | Craib | H04N 21/44209 725/54 |
| 2015/0066780 | A1 * | 3/2015 | Cohen | G06Q 10/101 705/300 |
| 2016/0127464 | A1 | 5/2016 | Watari | |
| 2016/0231834 | A1 * | 8/2016 | Hardi | H04L 51/046 |
| 2016/0261919 | A1 * | 9/2016 | Mandel | H04N 21/47217 |
| 2017/0195266 | A1 * | 7/2017 | Moyers | H04L 51/216 |
| 2018/0183840 | A1 * | 6/2018 | Lee | H04W 76/10 |
| 2018/0184171 | A1 * | 6/2018 | Danker | H04N 5/272 |
| 2018/0295170 | A1 * | 10/2018 | Van Wie | H04L 41/22 |

(Continued)

FOREIGN PATENT DOCUMENTS

| | | | |
|---|---|---|---|
| CN | 109410900 A | 3/2019 | |
| CN | 110958464 A | 4/2020 | |

(Continued)

OTHER PUBLICATIONS

International Search Report dated Jul. 13, 2023 for International Application No. PCT/SG2022/050790.

*Primary Examiner* — James N Fiorillo
(74) *Attorney, Agent, or Firm* — Faegre Drinker Biddle & Reath LLP

(57) ABSTRACT

Methods, systems and storage media for generating an effect configured by one or more network connected devices are disclosed. Some examples may include: receiving first effect configuration information from a first device, receiving second effect configuration information from a second device, generating at least one of a visual effect or an audio effect from the first effect configuration information or the second effect configuration information and providing the generated at least one of the at least one of the visual effect or the audio effect to the first device.

17 Claims, 8 Drawing Sheets

(56) References Cited

U.S. PATENT DOCUMENTS

| | | | | |
|---|---|---|---|---|
| 2019/0208248 A1* | 7/2019 | Cheung | ............ | H04N 21/44226 |
| 2020/0104466 A1* | 4/2020 | Denton | ................... | G06F 21/10 |
| 2020/0259877 A1* | 8/2020 | Girardier | ............. | H04B 17/309 |
| 2021/0099655 A1* | 4/2021 | Jaynes | ..................... | H04N 7/15 |
| 2021/0387099 A1* | 12/2021 | Desserrey | ............... | G06T 11/00 |
| 2022/0198026 A1* | 6/2022 | Barron | ................... | G06F 21/60 |

FOREIGN PATENT DOCUMENTS

| | | |
|---|---|---|
| CN | 111383619 A | 7/2020 |
| CN | 113282268 A | 8/2021 |

\* cited by examiner

METHODS, SYSTEMS AND STORAGE MEDIA FOR GENERATING AN EFFECT CONFIGURED BY ONE OR MORE NETWORK CONNECTED DEVICES

BACKGROUND

Systems of networks may be configured for different clients thereby allowing the different clients connected to the systems of networks to communicate. In some examples, one or more of the client devices may be running or otherwise executing an app or application that may provide an augmented reality effect specific to and/or local to the respective client device. In many instances, the app or application may be a social network application that allows a user of the client device to participate in the augmented reality effect. For example, a social networking application may include one or more interfaces that allows a user to change the displayed content. In examples, the app, application, and/or website may be designed or otherwise configured to acquire or receive input from multiple users such that the user input may be transferred through a network, processed, and then displayed or otherwise visualized on devices other than those executing, running, or hosting the application and/or website. However, such social networking applications that receive or otherwise collect input data from different users or different users devices do not provide such data in a manner that can be visualized on devices other than devices external to the user device. For example, such information may be displayed or otherwise visualized at a projector or other display device; however, such information, or the rendering of such information, is not provided back to the one or more user device's from which the information was received and/or collected.

Accordingly, improvements to systems and methods directed to improving information displayed to one or more network connected devices are needed. It is with respect to these and other general considerations that examples have been described. Although relatively specific problems have been discussed, it should be understood that the examples described herein should not be limited to solving the specific problems identified in the background above.

SUMMARY

One aspect of the present disclosure relates to a method for generating an effect configured by one or more network connected devices. The method may include receiving first effect configuration information from a first device. The method may include receiving second effect configuration information from a second device. The method may include generating at least one of a visual effect or an audio effect from the first effect configuration information or the second effect configuration information. The method may include providing the generated at least one of the at least one of the visual effect or the audio effect to the first device.

Another aspect of the present disclosure relates to a system for generating an effect configured by one or more network connected devices. The system may include one or more hardware processors configured by machine-readable instructions for generating an effect configured by one or more network connected devices. The machine-readable instructions may be configured to receive first effect configuration information from a first device. The machine-readable instructions may be configured to receive second effect configuration information from a second device. The machine-readable instructions may be configured generate at least one of a visual effect or an audio effect from the first effect configuration information or the second effect configuration information. The machine-readable instructions may be configured to provide the generated at least one of the at least one of the visual effect or the audio effect to the first device.

Another aspect of the present disclosure relates to a computer-readable storage medium for generating an effect configured by one or more network connected devices. In some examples, the computer-readable storage medium may include instructions being executable by one or more processors to receive first effect configuration information from a first device. In some examples, the computer-readable storage medium may include instructions being executable by one or more processors to receive second effect configuration information from a second device. In some examples, the computer-readable storage medium may include instructions being executable by one or more processors to generate at least one of a visual effect or an audio effect from the first effect configuration information or the second effect configuration information. In some examples, the computer-readable storage medium may include instructions being executable by one or more processors to provide the generated at least one of the at least one of the visual effect or the audio effect to the first device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
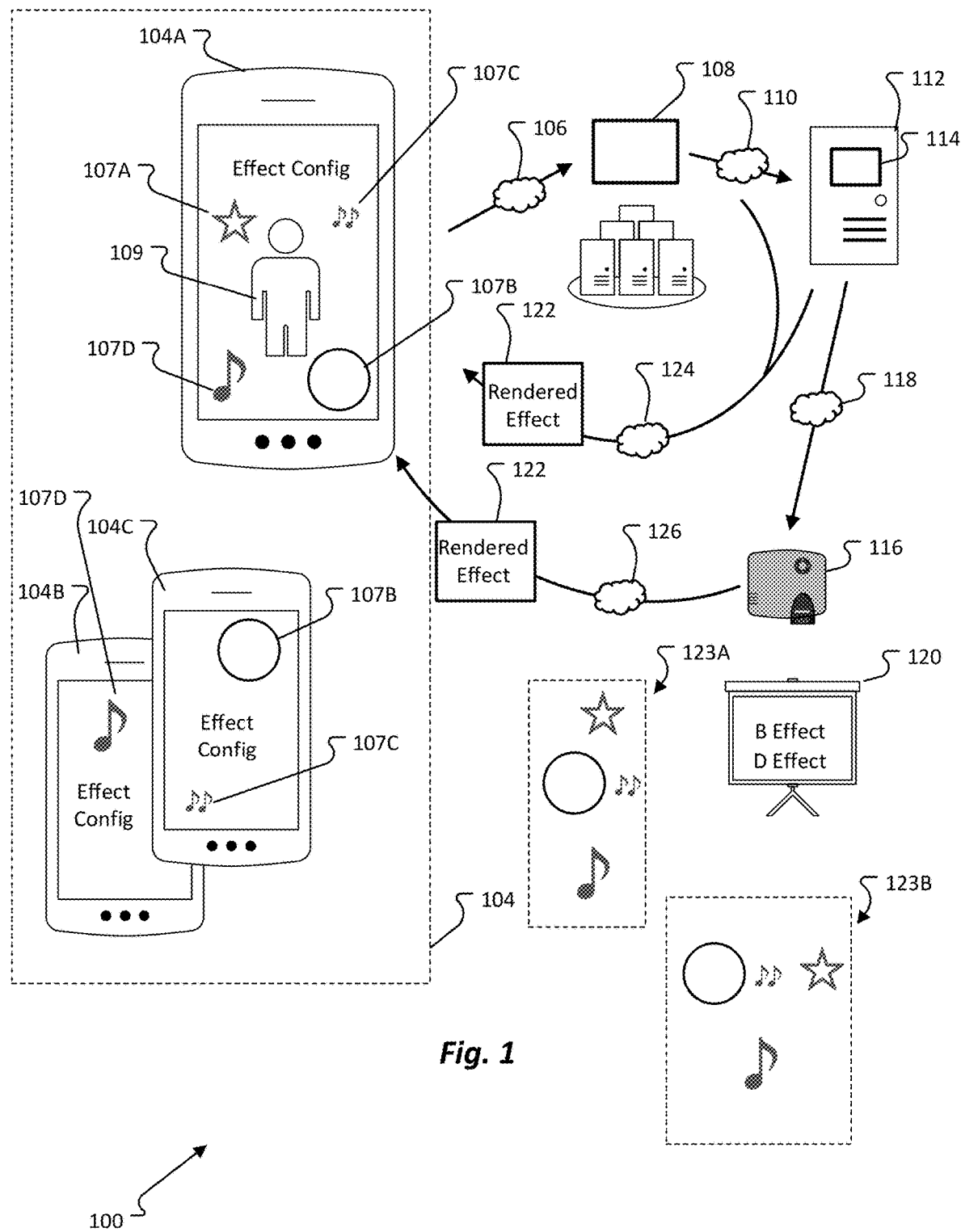
FIG. 1 depicts a first example of a system for a network connected activation effect in accordance with examples of the present disclosure.

In the following detailed description, references are made to the accompanying drawings that form a part hereof and in which are shown by way of illustrations specific embodiments or examples. These aspects may be combined, other aspects may be utilized, and structural changes may be made without departing from the present disclosure. Examples may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Systems of networks may be configured for different clients thereby allowing the different clients connected to the systems of networks to communicate. In some examples, one or more of the client devices may be running or otherwise executing an app or application that may provide an augmented reality effect specific to and/or local to the respective client device. In many instances, the app or application may be a social network application that allows a user of the client device to participate in the augmented reality effect. For example, a social networking application may include one or more interfaces that allows a user to change the displayed content. In examples, the app, application, and/or website may be designed or otherwise configured to acquire or receive input from multiple users such that the user input may be transferred through a network, processed, and then displayed or otherwise visualized on devices other than those executing, running, or hosting the application and/or website. However, such social networking applications that receive or otherwise collect input data from different users or different users devices do not provide such data in a manner that can be visualized on devices other than devices external to the user device. For example, such information may be displayed or otherwise visualized at a projector or other display device; however, such information, or the rendering of such information, is not provided back to the one or more user device's from which the information was received and/or collected. Accordingly, examples described herein are directed to receiving and/or collecting input data from a plurality of user devices, providing such data to a server or other application configured to generate or render such information, and then providing the generated or rendered information back to one or more of the user's devices such that other content displayed at the one or more user devices may be rendered or displayed with the previously generated or rendered information.

In accordance with examples of the present disclosure, a server, such as a server including a WebSocket protocol, may be configured or otherwise initiated to provide a functionality for providing or otherwise receiving user information. Accordingly, an effect having multiple user interface elements, including, but not limited to buttons, sliders, text fields, dropdown lists, checkboxes, toggles, and color pickers may be displayed to a user at a user device. A user may configure the effect utilizing the interface elements such that the configured effect, or information representative of the configured effect, may be provided to the server. In some examples, the effect may be activated by a plurality of users such that information representative of the configured effect is received at the server from multiple users. In some examples, a generated and/or displayed effect may be dependent upon the information received from each of the users based on when each of the users connected with the server. For example, the user information may be queued based on a time associated with when the device connected with the server. Alternatively, or in addition, a generated and/or displayed effect may be based upon the information received from each of the clients and may not be specifically dependent upon a time when the device connected to the server.

Accordingly, in instances where the information from each user is dependent upon a connection time when the user or device connected to the server, the input data may be sent from a first client or device to an information queue residing at the server. In some examples, each device may be queued such that information is not sent from each device until a prior device finishes communicating with the server or a communication connection between a prior device and the server is lost. Accordingly, the prior device may be removed from the queue such that information from each device may be received at the server in a queued fashion until no additional clients remain in the queue.

In examples, software or instructions may be configured to render or generate visual and audio information based on the information received from each device. Thus, effect configuration information may be used to generate visuals and/or sound based on access and then play visual and/or audio information from existing files or from a designated location. Thus, the software or instructions may then be configured to communicate with the server, receive the information from the server, and then process the information to generate visual and audio renderings to output the result, in real-time, to other hardware devices configured to display, play, and/or project the rendered information. Non-limiting examples of the hardware include, but are not limited to, a projector, LED/LCD display, DMX lights, and/or analog lights. In some examples, the server, or software, may then receive other user information (e.g., a displayed image, figure, icons, etc.) that is received or otherwise captured from a user's device, and combine that with the generated or rendered visual and/or audio information. Such combined output may then be provided to one or more of the user devices from which effect configuration details were received and/or assisted in activating the effect at the server. That is, the combined output may then be shared with other users and devices.

In accordance with examples of the present disclosure, the social networking applications may collect input data from multiple users, and transfer the data through a network to external devices such that the collected information and/or configuration information from multiple users is used to generate or render audio and/or video output for display to external hardware devices as well as shared with other user devices.

FIG. 1 depicts a first example of a system 100 for a network connected activation effect in accordance with examples of the present disclosure. More specifically, the system 100 may include a plurality of devices 104 (e.g., 104A, 104B, 104C). Each of the devices may be associated with a different user and different effect configuration. For example, a first device may include effect configuration information indicating how an element 107A, such as a star, is to be displayed. Such information may include, but is not limited to, color, shape, size, movement, spin, type, etc. of the element 107A. In examples, the device 104A may connect to a server 108; the server 108 may exist or otherwise reside on a cloud-oriented platform implemented by one or more datacenters geographically located in different areas. In examples, the effect configuration of the device 104A may be provided to the server 108.

In examples, each device of the plurality of devices 104 may connect to the server 108, where each device of the plurality of devices 104 may be accessed or otherwise be listed or identified in a queue. In examples, the queue may include the effect configuration information (e.g., configuration information for elements 107A, 107B, and/or 107C) communicated from each device of the plurality of devices 104. The effect configuration information may be provided to the server 108 via a cloud or networked environment 106, where the server 108 may maintain or otherwise manage the queue. In some examples, the server 108 may then provide the effect configuration information via the cloud or network environment 106 received from the plurality of devices 104 to software or instructions 114 configured to generate a visual representation of the effect configuration and/or play audio as indicated by the effect configuration information. Such effect configuration information includes effect configuration information from the plurality of devices 104 and may be communicated via the cloud or networked environment 110. The cloud or networked environment 110 may be the same as or similar to the cloud or networked environment 106. Alternatively, or in addition, the effect configuration information may include effect configuration information from a single device of the plurality of devices 104 such that the server 108 sends information including single effect configuration information for each respective device 104 in accordance with the queue.

The software or instructions 114 may reside on a server or device 112 and may be separate from the server 108. In some examples, the software or instructions 114 may reside on the server 108. Accordingly, the server 108 and/or the software or instructions 114 may generate or render visual and/or audio information based on the effect configuration received from one or more of the plurality of devices 104. In accordance with examples of the present disclosure, the software or instructions 114 and/or the server 108 may provide the generated or rendered visual and/or audio information to a hardware device 116, such as but not limited to a projector, via a cloud or networked environment 118. The cloud or networked environment 118 may be the same as or similar to the cloud or networked environments 106 and 110 previously described. The hardware device 116 may then project the rendering (e.g., video and/or audio) based on the effect configuration from one or more of the plurality of devices 104 to a display 120 for example. Alternatively, or in addition, the rendering (e.g., video and/or audio) may be displayed at a display device that does not include a projector. As one example, the rendering 123A and/or 123B may represent a rendering displayed to or projected onto the display 120. In some examples, only one element (e.g., such as the star) may be included in the rendering, where the single element is configured by a single device of the plurality of devices 104. Alternatively, or in addition, the plurality of elements are part of the rendering 123A and/or 123B such that the configuration of each element may be based on effect configuration information received from one or more of the plurality of devices 104.

In some examples, the hardware device 116, the device 112, and/or the server 108 may provide the rendering displayed to or projected onto the display 120 back to one or more of the devices 104. For example, the rendered effect 122, which may be the same as or similar to the rendering 123A and/or 123B, may be provided to the device 104A. The device 104A may then receive the rendered effect and combine the rendered effect with content (such as content 109) displayed at a display of the device 104A. Accordingly, the rendered effect together with the content 109 may be displayed at the display device 104A. In some examples, the rendered effect 122 may be provided to one or more of the plurality of devices 104 via the cloud or networked environment 124 and/or 126, which may be the same as or similar to the cloud or networked environments 106 and 124 as previously described. For example, the rendered effect 122 may be provided to the device 104C to be combined with content displayed at a display of the device 104C. Alternatively, or in addition, one or more of the devices 104 may receive the rendered effect combined with content (such as content 109) displayed at any of the displays of the device 104A.

Figure 2:
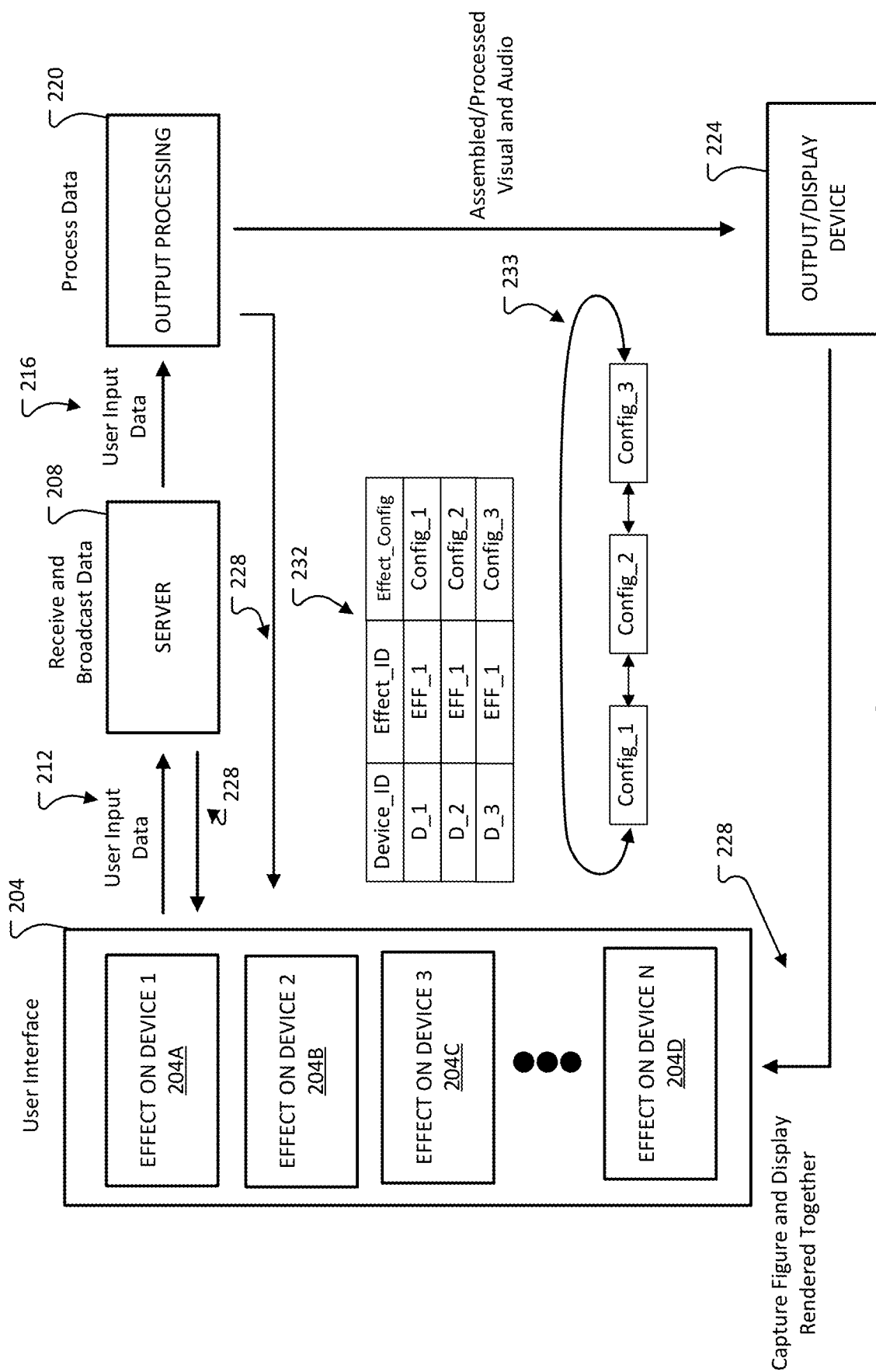
FIG. 2 depicts additional details of a system for a network connected activation effect in accordance with examples of the present disclosure.

FIG. 2 depicts additional details of a system 200 for a network connected activation effect in accordance with examples of the present disclosure. The system 200 may be the same as or similar to the system 100. More specifically, the system 200 may include a plurality of user interfaces (e.g., 204) rendered to each of a plurality of displays of devices (e.g., 104, 104A, 104B, 104C). Thus, an effect on the devices (e.g., 204A-204D) may be provided to the server 208 as user input data 212. In examples, the user input data 212 may identify a device, an effect, and/or a configuration of the effect. An order of the devices 204A-204B connected to the server 208 may be dependent upon a time in which each of the devices connected to the server 208; that is, each of the devices may communicate effect configuration information 204 to the server 208 in a queued fashion, where the queued fashion is based on a time of connection. Alternatively, or in addition, each device may be placed in a queue and may only communicate effect configuration information 204 upon a queued turn.

As previously described, the server 208 may receive the effect configuration information and provide the effect configuration information as user input data 216 for output processing at 220. Thus, the user input data 216 may be processed such that audio and visual information may be rendered or generated based on the user input data 216. In examples, the user input data 216 may be from a single device (e.g., only 204A) or it may be from a plurality of devices (e.g., 204A, 204B). In examples, at the output processing 220, a rendering or image as generated by the processing 220 may be generated and provided to one or more of the user devices as 228 and/or an output/display device 224, which may be a projector or other hardware device. Alternatively, or in addition, the rendering or image as generated by the processing 220 may be generated and provided to a device that is at the front, top, or in a first position of the queue and/or otherwise communicating directly with the server 208. Alternatively, or in addition, a rendering or image as generated by the processing 220 may be generated and provided to the server 208 and then provided to one or more user devices. In examples where the user input data 212 is provided to the server 208 in a queued manner, the effect configuration information may be rendered and/or displayed as illustrated at 233. That is, as illustrated at 233, each rendering corresponding to each effect configuration information may be received from one or more devices in a sequential manner; thus, the rendering or image based on the effect configuration information may be displayed in a similar sequential manner.

Figure 3:
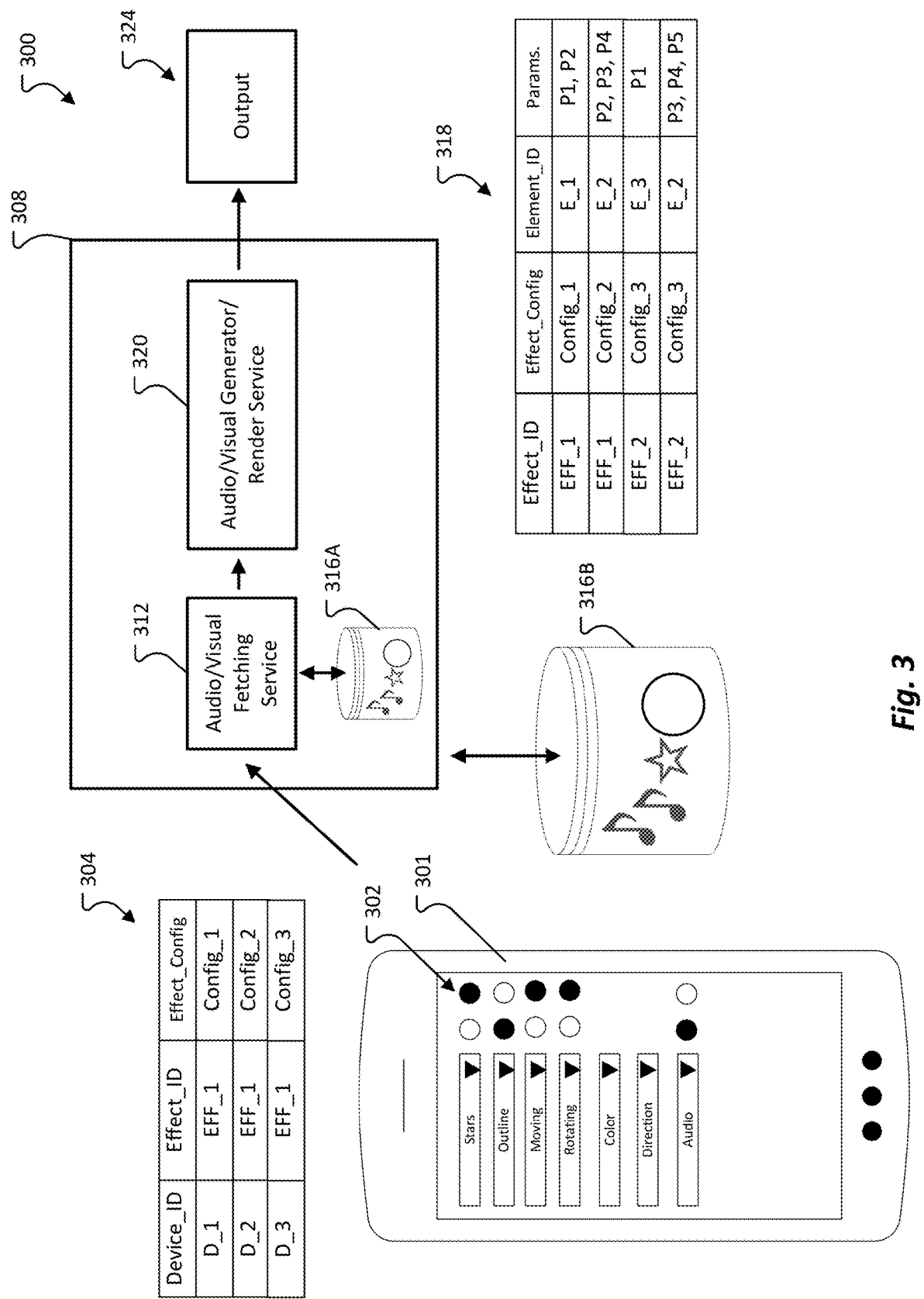
FIG. 3 depicts additional details of a system for a generation and display of a network connected activation effect in accordance with examples of the present disclosure.

FIG. 3 depicts additional details of a system 300 for a generation and display of a network connected activation effect in accordance with examples of the present disclosure. The system 300 may be the same as or similar to the system 200. More specifically, the system 300 may include a server 308 which may receive and store effect configuration information in an effect configuration information data structure 304; the effect configuration information may be received from one or more user interfaces 302 of one or more devices 301. In examples, the user interface 302 may render, to a display, a plurality of controls or elements. The configuration of the controls or elements output to the user interface 302 may comprise the effect configuration information configured by a user and received at a server 308 from the respective device. Such effect configuration information may be provided to the server 308 and then stored in a data structure, such as the data structure 304 for example. In examples, the data structure 304 may include a device identifier field, an effect identifier field, and an effect configuration field.

In examples, an audio/video fetching service 312 may obtain rendering or generating information specific to effect configuration information received in the data structure 304 for example. That is, based on the information in the data structure 304, the audio/visual fetching service 312 may process such information to fetch effect and parameter information from existing audio and/or visual data that may reside in repository 316A and/or 316B for example. Such information may be received from a data structure 318 and/or stored in a data structure 318. The data structure 318 may include an effect identifier, an effect configuration, an element identifier (e.g., an element identified in the effect), and one or more parameters (such as movement, color, rotation, shape etc.). Accordingly, the audio/visual generator/render service 320 may generate images or renderings based on the information in the data structure 304 and/or 318. Such images or renderings may then be provided as output 324 as previously described.

Figure 4:
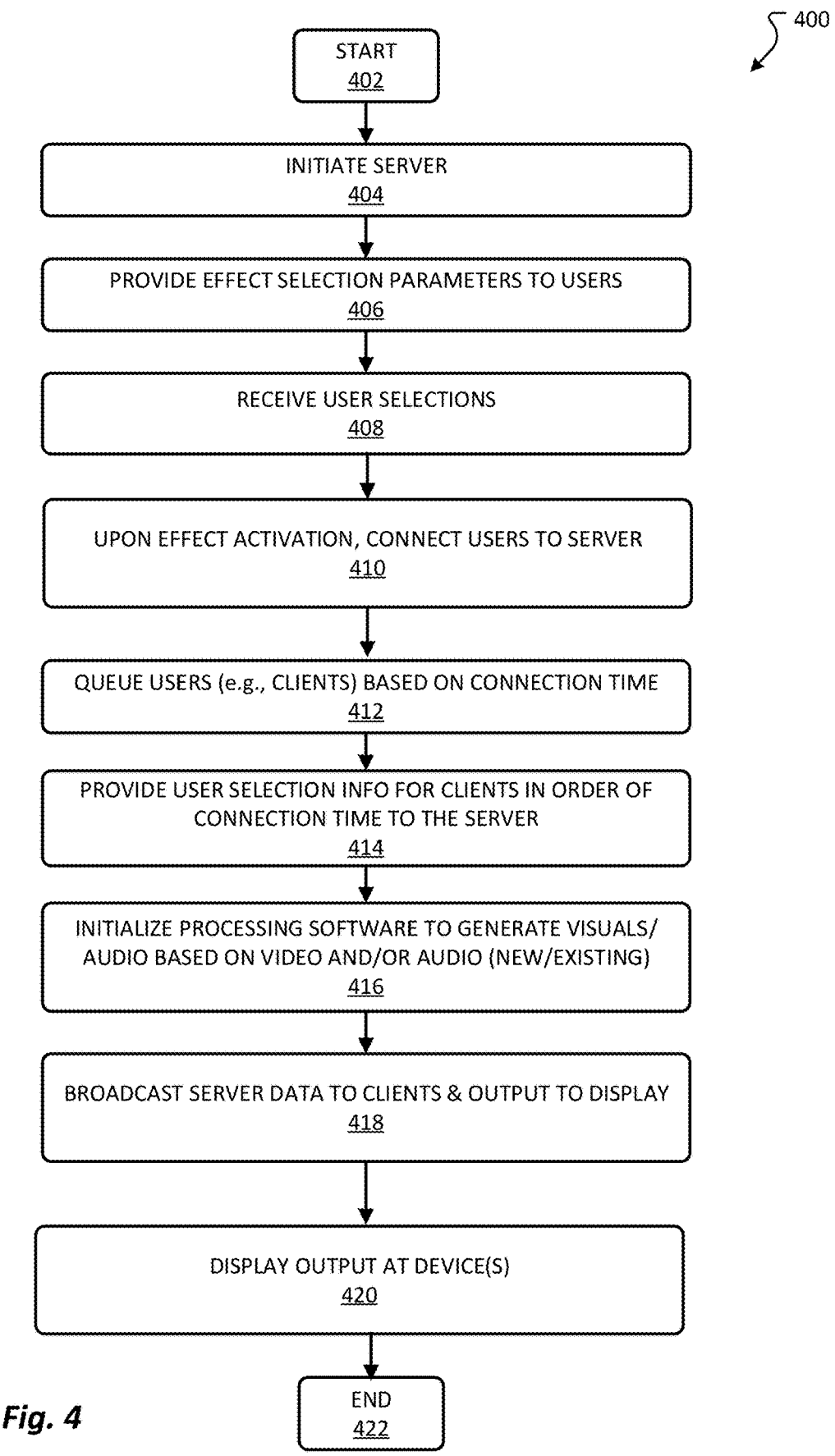
FIG. 4 depicts an example method for generating one or more visual and/or audio effects based on effect configuration information received from one or more devices in accordance with examples of the present disclosure.

FIG. 4 provides details of a method 400 for generating one or more visual and/or audio effects based on effect configuration information received from one or more devices in accordance with examples of the present disclosure. A general order for the steps of a 400 is shown in FIG. 4. Generally, the method 400 starts at 402 and ends at 422. The method 400 may include more or fewer steps or may arrange the order of the steps differently than those shown in FIG. 4. The method 400 can be executed as a set of computer-executable instructions executed by a computer system and encoded or stored on a computer readable medium. In the illustrative aspect, the method 400 is executed by a computing device (e.g., 104) associated with a user and/or a server (e.g., 108). However, it should be appreciated that aspects of the method 400 may be performed by one or more processing devices, that may include but are not limited to the computing device 104 or a server 108. Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1-3.

The method 400 starts at 402, where flow may proceed to 404. At 404, a server may be initiated. As an example, a server configured to receive effect configuration information (e.g., server 108) may be initialized and/or configured to receive effect configuration information at 406, and provide such effect configuration information to a device configured to generate images and/or renderings based on the received effect configuration information. In examples, a user may access an app or website, where the app or website includes one or more controls or configurable elements rendered to the display of the device. In some examples, the server initiated at 402 may serve or host such app or website. Alternatively, or in addition, a different device may serve or host such information. Thus, at 408, the initiated server may receive one or more user selections specifying effect configuration information. For example, a user may interact with a user interface, configuring and/or selecting one or more controls specified on the user interface. Such configuration information may be directed to a network connected effect for an app or application. Accordingly, at 408, effect configuration information is received from one or more devices. In examples, a network connection effect may be activated at 410 if a plurality of users at least one of activate the app or application, connect to the initiated server, and/or provide effect configuration information to the initiated server. For example, based on a number of devices connected to the server initiated at 404, based on a number of devices identified as being in the queue, and/or based on the number of different effect configuration information received at the initiated server and/or in the queue, a network connected effect may be initiated. That is, if it is determined that a number of devices communicatively coupled to the initiated server meets or exceeds a number of devices configuration parameter, such as a threshold, then the connection effect may be activated. That is, based on the determination that the number of devices communicatively coupled to the initiated server meets or exceeds the number of devices configuration parameter, such as a threshold, at least one of a visual effect or an audio effect may be generated based on effect configuration information. Thus, at 412, the users, clients, effect configuration information, and/or devices may be queued according to a time at which such information and/or devices contacted the initiated server.

The method 400 may then move to 414 where the user selection information, or effect configuration information, may be provided for processing based on when a respective device makes contact or otherwise connects to the server initiated at 404. In examples, the effect configuration information may then be processed to generate images or renderings based on the effect configuration information. In examples, the server initiated at 404 may perform the processing and/or generation of the images and/or renderings at 416. Alternatively, or in addition, software, such as third-party software, may perform the processing and generation of images and/or renderings. In examples, at 418, the images and/or renderings may then be broadcast to one or more of the devices that provided the effect configuration information. Alternatively, or in addition, other devices may receive such images or renderings. Accordingly, at 420, at a display of a device that received the images and/or renderings, the images or renderings may be combined with other device specific renderings such that the image or renderings associated with the network connected effect may be displayed at the same time as the other device specific renderings. The method 400 may then end at 422.

Figure 5:
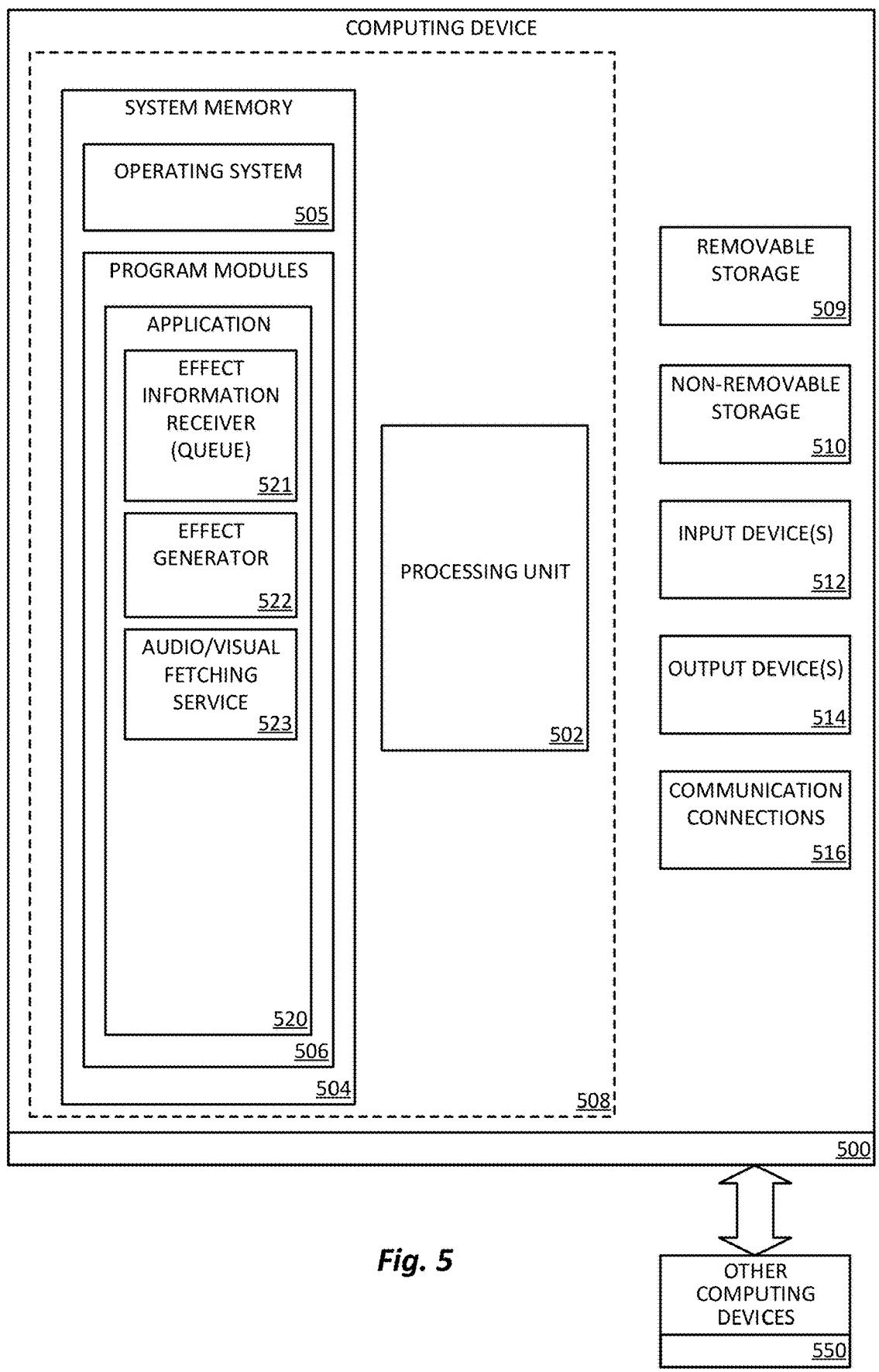
FIG. 5 is a block diagram illustrating physical components (e.g., hardware) of a computing device with which aspects of the disclosure may be practiced.
Figure 6A:
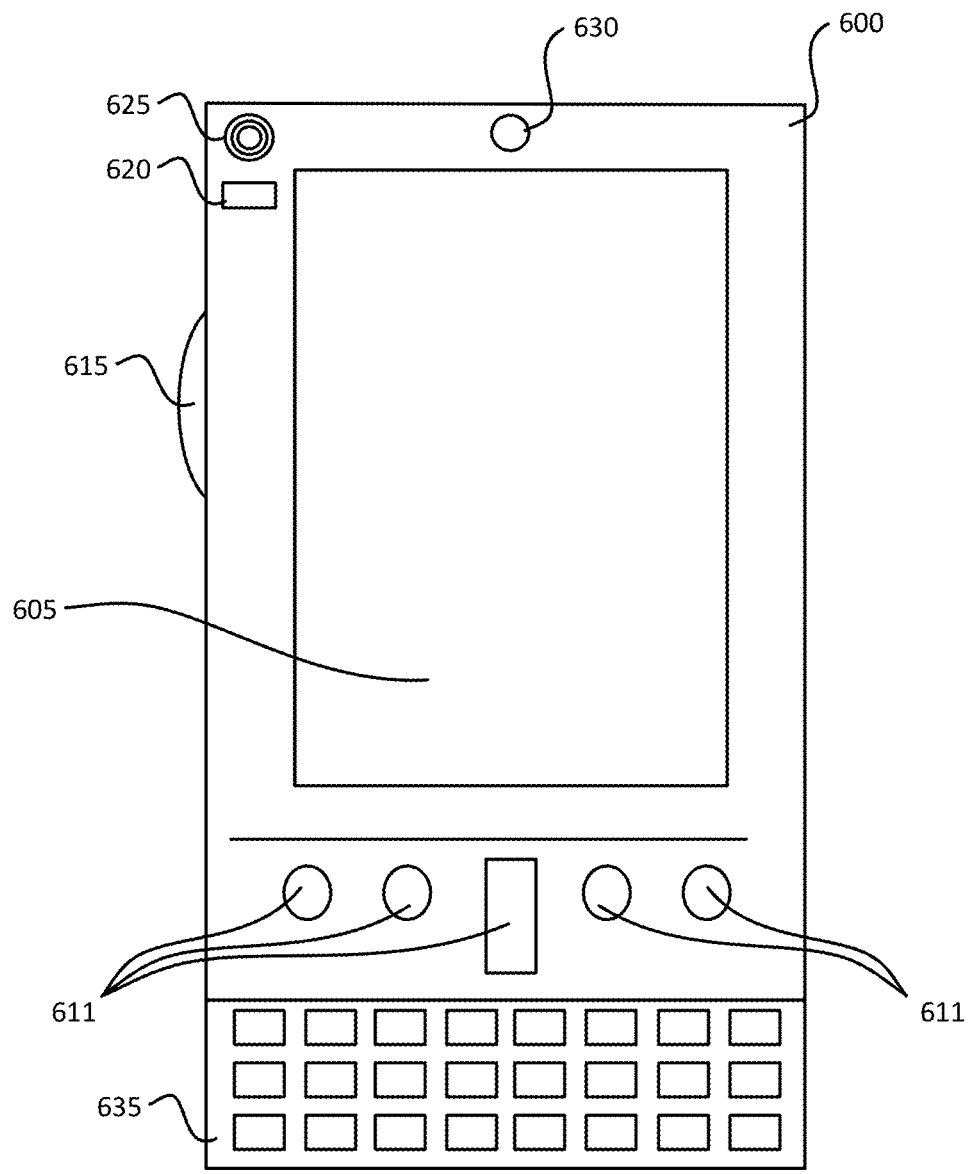
FIGS. 6A-6B illustrate a mobile computing device with which embodiments of the disclosure may be practiced.
Figure 6B:
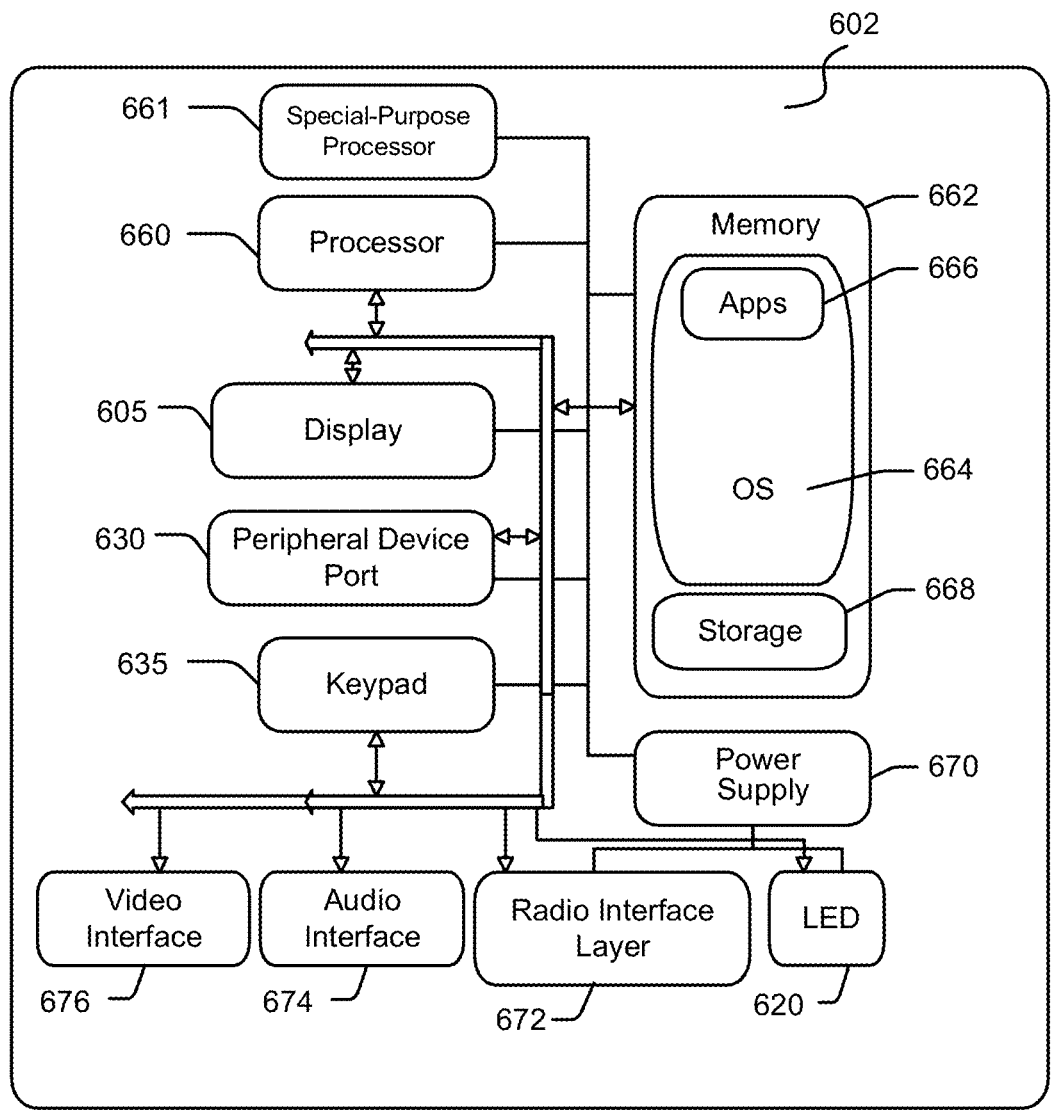
Figure 7:
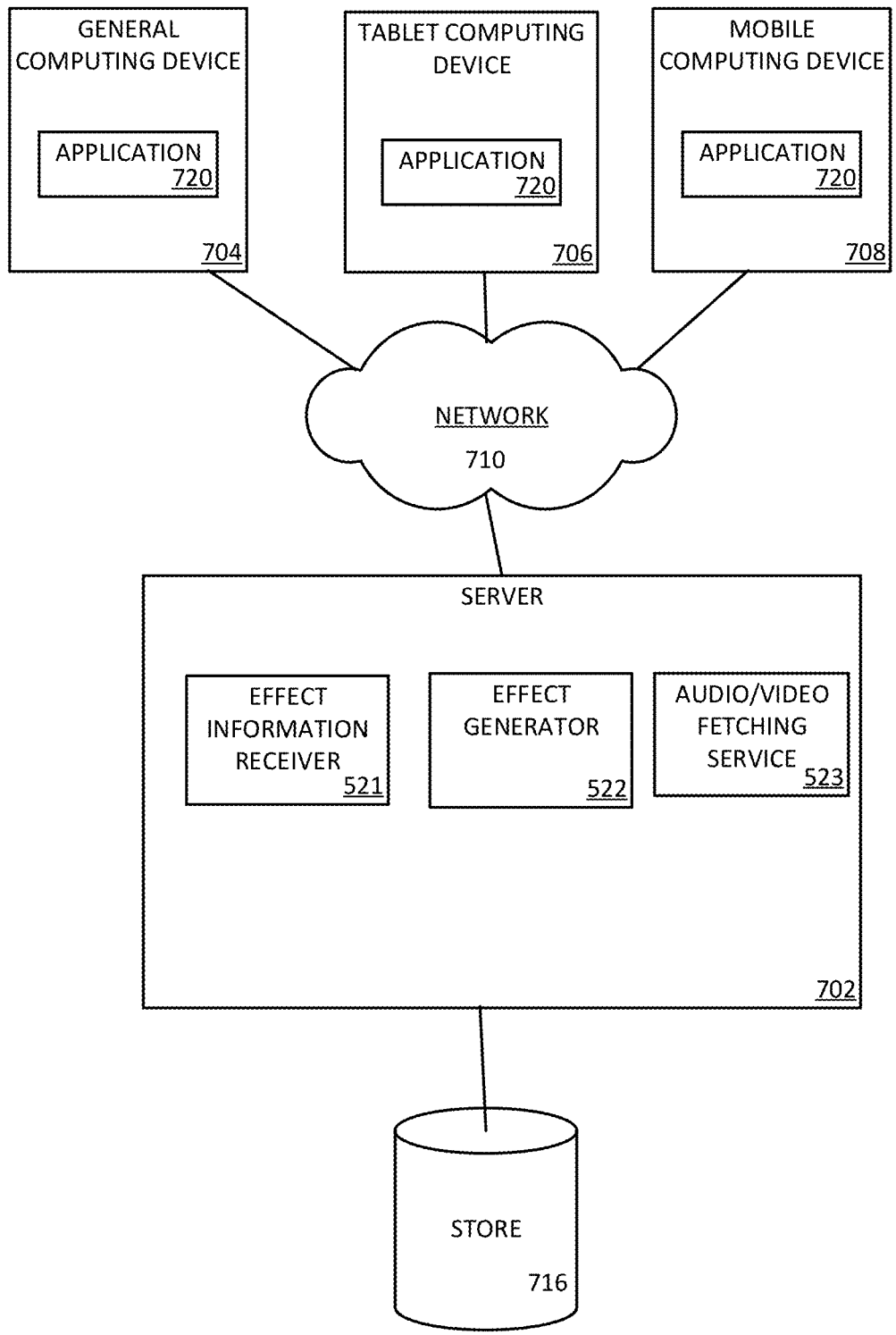
FIG. 7 illustrates one aspect of the architecture of a system for processing data.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing system 500 with which aspects of the disclosure may be practiced. The computing device components described below may be suitable for the computing and/or processing devices described above. In a basic configuration, the computing system 500 may include at least one processing unit 502 and a system memory 504. Depending on the configuration and type of computing device, the system memory 504 may comprise, but is not limited to, volatile storage (e.g., random-access memory (RAM)), non-volatile storage (e.g., read-only memory (ROM)), flash memory, or any combination of such memories.

The system memory 504 may include an operating system 505 and one or more program modules 506 suitable for running software applications 520, such as one or more components supported by the systems described herein. As examples, system memory 504 may include an effect information receiver 521 that receives effect configuration information from one or more external devices and in some instances queues the device and/or the information received from the device. The system memory 504 may include the effect generator 522 which may be software or instructions (e.g., 114) and/or the audio/visual generator/render service 320. The system memory 504 may include an audio/visual fetching service 523 configured to retrieve audio/video effects based on effect configuration information received from one or more devices. The operating system 505, for example, may be suitable for controlling the operation of the computing system 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing system 500 may have additional features or functionality. For example, the computing system 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing system 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and non-volatile, removable, and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 500. Any such computer storage media may be part of the computing system 500. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A-6B illustrate a mobile computing device 600, for example, a mobile telephone, a smartphone, wearable computer (such as a smartwatch), a tablet computer, a laptop computer, and the like, with which embodiments of the disclosure may be practiced. In some respects, the client may be a mobile computing device. With reference to FIG. 6A, one aspect of a mobile computing device 600 for implementing at least one of the aspects is illustrated. In a basic configuration, the mobile computing device 600 is a handheld computer having both input elements and output elements. The mobile computing device 600 typically includes a display 605 and one or more input buttons 611 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate greater or fewer input elements. For example, the display 605 may not be a touch screen in some embodiments.

In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display.

In various examples, the output elements include the display 605 for showing a graphical user interface (GUI), a visual indicator 620 (e.g., a light-emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports 630, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, email, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, email programs, word processing programs, spreadsheet programs, Internet browser programs, messaging programs, and one or more apps or application capable of participating in or otherwise performing a network effect activation. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light-emitting diode (LED), and the audio transducer 625 is a speaker. These devices may be directly coupled to the power supply 670 so that when activated, they remain on for a duration dictated by the notification mechanism even though the processor 660/661 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an onboard camera to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. The personal computer 704, tablet computing device 706, or mobile computing device 708 may include a user interface 720 allowing a user to interact with one or more program modules as previously described. One or more of the previously described program modules 506 or software applications 521-523 may be employed by server device 702 and/or the personal computer 704, tablet computing device 706, or mobile computing device 708, as described above. For example, the server device 702, and in many examples the personal computer 704, tablet computing device 706, and/or mobile computing device 708 may include an effect information receiver 521 that receives effect configuration information from one or more external devices and in some instances queues the device and/or the information received from the device. the server device 702, and in many examples the personal computer 704, tablet computing device 706, and/or mobile computing device 708 may include the effect generator 522 which may be software or instructions (e.g., 114) and/or the audio/visual generator/render service 320. the server device 702, and in many examples the personal computer 704, tablet computing device 706, and/or mobile computing device 708 may include an audio/visual fetching service 523 configured to retrieve audio/video effects based on effect configuration information received from one or more devices.

The server device 702 may provide data to and from a client computing device such as a personal computer 704, a tablet computing device 706 and/or a mobile computing device 708 (e.g., a smartphone) through a network 710. By way of example, the computer system described above may be embodied in a personal computer 704, a tablet computing device 706 and/or a mobile computing device 708 (e.g., a smartphone). Any of these examples of the computing devices may obtain content from the store 716, in addition to receiving graphical data useable to be either pre-processed at a graphic-originating system, or post-processed at a receiving computing system. The store 716 may also include effect information, such as the data structure 232, 304, 318, and/or the repository 316A and/or 316B.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via onboard computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for generating an effect configured by one or more network connected devices according to at least the examples provided in the sections below.

(A1) In one aspect, some examples include a method for generating an effect configured by one or more network connected devices. The method may include: receiving first effect configuration information from a first device, receiving second effect configuration information from a second device, generating at least one of a visual effect or an audio effect from the first effect configuration information or the second effect configuration information, and providing the generated at least one of the at least one of the visual effect or the audio effect to the first device.

(A2) In some examples of A1, the method further includes: determining that the first device is no longer communicatively coupled to the server; generating at least one of a second visual effect or a second audio effect from the second effect configuration information; and providing the generated at least one of the second visual effect or the second audio effect to the second device.

(A3) In some examples of A1-A2, the generated at least one of the visual effect or the audio effect is based on both the first configuration information and the second configuration information.

(A4) In some examples of A1-A3, the method further includes: providing the generated at least one of the visual effect or the audio effect to the second device.

(A5) In some examples of A1-A4, the method further includes: causing the first device to render output to a display that is based on the generated at least one of the visual effect or the audio effect.

(A6) In some examples of A1-A5, the method further includes: causing a first user interface to be displayed at the first device, wherein the first user interface includes a plurality of configurable control elements and the first effect configuration information is based on the configurable control elements.

(A7) In some examples of A1-A6, the method further includes: queuing at least one of the first device and the second device or the first effect configuration information and the second effect configuration information into a queue, wherein a position of the first device and second device or a position of the first effect configuration information and the second effect configuration information in the queue is based on a time associated with a connection event between the first device or second device and the server.

(A8) In some examples of A1-A7, the method further includes: retrieving at least one of visual information or audio information from a repository based on at least one of the first effect configuration information or the second effect configuration information; and generating at least one of a visual effect or an audio effect from the first effect configuration information or the second effect configuration information.

(A9) In some examples of A1-A8, the method further includes: determining that a number of devices communicatively coupled to a server meets or exceeds a number of devices configuration parameter; and based on the determination, generating at least one of a visual effect or an audio effect from the first effect configuration information or the second effect configuration information; and In yet another aspect, some examples include a system including one or more processors and memory coupled to the one or more processors, the memory storing one or more instructions which when executed by the one or more processors, causes the one or more processors to perform any of the methods described herein (e.g., A1-A8 described above).

In yet another aspect, some examples include a computer-readable storage medium storing one or more programs for execution by one or more processors of a device, the one or more programs including instructions for performing any of the methods described herein (e.g., A1-A8 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating an effect configured by one or more network connected devices, the method comprising:
   receiving first effect configuration information from a first device;
   receiving second effect configuration information from a second device;
   queuing both of i) the first device and the second device and ii) the first effect configuration information and the second effect configuration information into a queue, wherein a position of the first device, a position of the second device, a position of the first effect configuration information, and a position of the second effect configuration information in the queue is based on a time associated with a connection event between the first device or the second device and a server;
   generating at least one of a visual effect or an audio effect from the first effect configuration information or the second effect configuration information;
   providing the generated at least one of the at least one of the visual effect or the audio effect to the first device;
   determining that a number of devices communicatively coupled to the server meets or exceeds a number of devices configuration parameter;
   determining that the devices communicatively coupled to the server have provided effect configuration information to the server;
   based on determining the number of devices communicatively coupled to the server meeting or exceeding the number of devices configuration parameter and determining the devices communicatively coupled to the server have provided the effect configuration information to the server, generating a network connection effect including at least one of the visual effect or the audio effect from the first effect configuration information or the second effect configuration information; and
   providing the generated network connection effect to the first device.

2. The method of claim 1, further comprising:
   determining that the first device is no longer communicatively coupled to the server;
   generating at least one of a second visual effect or a second audio effect from the second effect configuration information; and
   providing the generated at least one of the second visual effect or the second audio effect to the second device.

3. The method of claim 1, wherein the generated at least one of the visual effect or the audio effect is based on both the first configuration information and the second configuration information.

4. The method of claim 1, further comprising providing the generated at least one of the visual effect or the audio effect to the second device.

5. The method of claim 1, further comprising causing the first device to render output to a display that is based on the generated at least one of the visual effect or the audio effect.

6. The method of claim 1, further comprising causing a first user interface to be displayed at the first device, wherein the first user interface includes a plurality of configurable control elements and wherein the first effect configuration information is based on the configurable control elements.

7. The method of claim 1, further comprising:
   retrieving at least one of visual information or audio information from a repository based on at least one of the first effect configuration information or the second effect configuration information; and
   generating at least one of a visual effect or an audio effect from the first effect configuration information or the second effect configuration information.

8. A system, comprising:
   one or more hardware processors configured by machine-readable instructions to:
   receive first effect configuration information from a first device;
   receive second effect configuration information from a second device;
   queue both of i) the first device and the second device and ii) the first effect configuration information and the second effect configuration information into a queue, wherein a position of the first device, a position of the second device, a position of the first effect configuration information, and a position of the second effect configuration information in the queue is based on a time associated with a connection event between the first device or the second device and a server;
   generate at least one of a visual effect or an audio effect from the first effect configuration information or the second effect configuration information;
   provide the generated at least one of the at least one of the visual effect or the audio effect to the first device;
   determine that a number of devices communicatively coupled to the server meets or exceeds a number of devices configuration parameter;
   determine that the devices communicatively coupled to the server have provided effect configuration information to the server;
   based on determining the number of devices communicatively coupled to the server meeting or exceeding the number of devices configuration parameter and determining the devices communicatively coupled to the server have provided the effect configuration information to the server, generate a network connection effect including at least one of the visual effect or the audio effect from the first effect configuration information or the second effect configuration information; and
   provide the generated network connection effect to the first device.

9. The system of claim 8, wherein the one or more hardware processors are further configured by machine-readable instructions to:
   determine that the first device is no longer communicatively coupled to the server;
   generate at least one of a second visual effect or a second audio effect from the second effect configuration information; and
   provide the generated at least one of the second visual effect or the second audio effect to the second device.

10. The system of claim 8, wherein the generated at least one of the visual effect or the audio effect is based on both the first configuration information and the second configuration information.

11. The system of claim 8, wherein the one or more hardware processors are further configured by machine-readable instructions to: provide the generated at least one of the visual effect or the audio effect to the second device.

12. The system of claim 8, wherein the one or more hardware processors are further configured by machine-readable instructions to: cause the first device to render output to a display that is based on the generated at least one of the visual effect or the audio effect.

13. The system of claim 8, wherein the one or more hardware processors are further configured by machine-readable instructions to: cause a first user interface to be displayed at the first device, wherein the first user interface includes a plurality of configurable control elements and the first effect configuration information is based on the configurable control elements.

14. The system of claim 8, wherein the one or more hardware processors are further configured by machine-readable instructions to: retrieve at least one of visual information or audio information from a repository based on at least one of the first effect configuration information or the second effect configuration information; and generate at least one of a visual effect or an audio effect from the first effect configuration information or the second effect configuration information.

15. A non-transient computer-readable storage medium comprising instructions being executable by one or more processors to perform a method, the method comprising:
receiving first effect configuration information from a first device;
receiving second effect configuration information from a second device;
queuing both of i) the first device and the second device and ii) the first effect configuration information and the second effect configuration information into a queue, wherein a position of the first device, a position of the second device, a position of the first effect configuration information, and a position of the second effect configuration information in the queue is based on a time associated with a connection event between the first device or the second device and a server;
generating at least one of a visual effect or an audio effect from the first effect configuration information or the second effect configuration information;
providing the generated at least one of the at least one of the visual effect or the audio effect to the first device;
determining that a number of devices communicatively coupled to the server meets or exceeds a number of devices configuration parameter;
determining that the devices communicatively coupled to the server have provided effect configuration information to the server;
based on determining the number of devices communicatively coupled to the server meeting or exceeding the number of devices configuration parameter and determining the devices communicatively coupled to the server have provided the effect configuration information to the server, generating a network connection effect including at least one of the visual effect or the audio effect from the first effect configuration information or the second effect configuration information; and
providing the generated network connection effect to the first device.

16. The computer-readable storage medium of claim 15, wherein the instructions are further configured to cause the one or more processors to:
determine that the first device is no longer communicatively coupled to the server;
generate at least one of a second visual effect or a second audio effect from the second effect configuration information; and
provide the generated at least one of the second visual effect or the second audio effect to the second device.

17. The computer-readable storage medium of claim 15, wherein the generated at least one of the visual effect or the audio effect is based on both the first configuration information and the second configuration information.

* * * * *